(12) United States Patent
McClure et al.

(10) Patent No.: US 6,823,646 B2
(45) Date of Patent: Nov. 30, 2004

(54) WRAPPING MATERIAL BRAKE RELEASE

(75) Inventors: John R. McClure, New Holland, PA (US); Stephen C. Schlotterbeck, Leola, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/198,749

(22) Filed: Jul. 19, 2002

(65) Prior Publication Data

US 2004/0159074 A1 Aug. 19, 2004

(51) Int. Cl.[7] .......................... B65B 63/04; A01F 15/07
(52) U.S. Cl. ........................ 53/118; 53/587; 53/389.4; 56/341; 100/5; 242/422.4
(58) Field of Search .................... 53/116, 118, 587, 53/389.2, 389.4; 56/341; 100/5, 15, 87–89; 242/422.4

(56) References Cited

U.S. PATENT DOCUMENTS

| | | |
|---|---|---|
| 2,346,756 A | 4/1944 | Hoppe |
| 3,190,574 A | 6/1965 | Purzycki |
| 4,691,503 A | 9/1987 | Frerich |
| 5,181,368 A | 1/1993 | Anstey et al. |
| 5,448,873 A * | 9/1995 | Jennings et al. ............... 53/118 |
| 5,687,548 A * | 11/1997 | McClure et al. ............... 53/118 |
| 5,974,764 A * | 11/1999 | Anstey et al. ................ 53/118 |
| 6,050,052 A * | 4/2000 | Herron et al. ................ 53/118 |
| 6,247,291 B1 | 6/2001 | Underhill |
| 6,536,337 B2 * | 3/2003 | Huchet et al. ................ 56/341 |
| 6,622,463 B1 * | 9/2003 | Anstey et al. ................ 53/587 |
| 6,651,408 B1 * | 11/2003 | McClure ...................... 53/587 |
| 6,691,491 B2 * | 2/2004 | Terminella et al. ........ 53/133.4 |

* cited by examiner

Primary Examiner—Stephen F. Gerrity
(74) Attorney, Agent, or Firm—John William Stader; Collin A. Webb (57) ABSTRACT

A wrapping material brake release assembly, including a wrapping material dispenser roll mount pivotable between a first functional position to dispense material from a dispenser roll and a second access position to provide access to the dispenser roll. A brake assembly having a brake member is arranged to brake the dispenser roll when the mount is in the first functional position. A ramp-shaped lifting member is arranged to lift the brake member from the dispenser roll when the mount is pivoted from the first position to the second position. The roll mount includes a pivot plate arranged to pivot from the first to the second positions, and a shaft attached at one end to the pivot plate. The roll mount has a brake drum, and the brake member has a brake arm and a brake pad attached to the brake arm.

16 Claims, 7 Drawing Sheets

WRAPPING MATERIAL BRAKE RELEASE

FIELD OF THE INVENTION

This invention relates to round balers that include a bale wrapping apparatus for wrapping a harvested crop material with a wrapping material, such as a net or twine, to produce shaped bales of harvested crop material for convenient transport and storage. More particularly, the present invention relates to a round baler with a bale wrapping apparatus, wherein the round baler also includes a wrapping material brake release that works when accessing and repositioning a wrapping material dispenser roll mount.

BACKGROUND OF THE INVENTION

Round balers of the prior art generally have a bale forming chamber defined by walls of a housing and an apron formed by an array of side-by-side belts, transverse slats entrained on chains, a plurality of rolls or a combination of various elements (e.g., rolls and belts). Cut crop material, such as straw, hay, and the like, is picked up from the ground by a crop pick-up assembly as the baler moves along a field. A conveyor or feeder assembly then takes the cut crop material and feeds it into the bale forming chamber, which may be a fixed or variable chamber, where the cut crop material accumulates and is compressed by a bale forming apparatus to form a cylindrical package of cut crop material, commonly referred to as a "round bale." The bale, while it is in this compacted and formed state, is wrapped by a bale wrapping apparatus with a wrapping material such as twine, netting, plastic film, or the like. The end result is a wrapped form-sustaining bale, typically having a round or cylindrical shape, that is ejected from the bale-forming chamber onto the ground for subsequent handling.

One problem with the prior art balers is that whenever wrapping material runs out or other need for servicing occurs, to access the spent material roll, the operator must separately undertake to remove or disengage the wrapping material dispenser roll brake before the spent roll can be accessed for its removal, replacement, or for other servicing of the baler.

A second problem with the prior art balers is that once such access has allowed the requisite roll replacement or other servicing, the operator must likewise, separately undertake to reposition the wrapping material dispenser roll to its functional position and reengage the wrapping material dispenser roll brake before the wrapping material roll is ready for use. Such repositioning of the wrapping material dispenser roll requires that the brake again be in a disengaged position until the repositioning of the wrapping material dispenser roll is completed. Only then, can the operator reengage the brake onto the dispenser roll.

Hence, there is a need for a more convenient and practical mechanism for disengaging a wrapping material brake from a wrapping material dispenser roll, both during access to the roll and during repositioning of the roll. More particularly, there is a need for a brake release mechanism that not only keeps the brake in a disengaged position during access to and repositioning of the roll, but also causes or allows the brake to reengage the dispenser roll once the roll is repositioned.

The present invention therefore endeavors to provide an improved baler that includes a mechanism for disengaging the brake during access and repositioning of a wrapping material dispenser roll that overcomes the disadvantages of the prior art balers.

Accordingly, one object of the present invention is to overcome the limitations of the prior art balers that require the separate steps of disengaging the brake when accessing and repositioning the material dispenser roll mount, and of reengaging the brake once the mount is repositioned to a functional position.

Another object of the present invention is to provide a baler with a convenient and elegant mechanism for automatically disengaging the brake when accessing and repositioning the material dispenser roll mount, and for automatically reengaging the brake once the mount is repositioned to a functional position.

Yet another object of the present invention is to provide a baler with a durable and reliable mechanism for automatically disengaging the brake when accessing and repositioning the material dispenser roll mount, and for automatically reengaging the brake once the mount is repositioned to a functional position.

Still another object of the present invention is to provide a baler with a mechanism for automatically disengaging the brake when accessing and repositioning the material dispenser roll mount, and for automatically reengaging the brake once the mount is repositioned to a functional position that is practical and cost effective to manufacture.

SUMMARY OF THE INVENTION

In accordance with the above objects and other objects, which will be readily apparent to one having skill in the art, the present invention provides a wrapping material brake release assembly. The brake release assembly comprises, a wrapping material dispenser roll mount pivotable between a first functional position to dispense material from a dispenser roll and a second access position to provide access to the dispenser roll. A brake assembly is provided having a brake member arranged to brake the dispenser roll when the mount is in the first functional position. A ramp-shaped lifting member is arranged to lift the brake member from the dispenser roll when the mount is pivoted from the first position to the second position.

According to one preferred embodiment of the invention, the ramp-shaped lifting member has first and second ramped sides. The first ramped side engages the brake assembly when the mount is pivoted from the first position to the second position. The second ramped side engages the brake assembly while the mount is pivoted from the second position back to the first position.

According to a further embodiment, the roll mount further comprises a brake drum. The brake member comprises a brake arm and a brake pad attached to the brake arm and arranged to contact the brake drum to brake the roll.

According to yet another embodiment of the invention, the roll mount further comprises a pivot plate arranged to pivot from the first to the second positions, and a shaft attached at one end to the pivot plate.

According to a still further embodiment of the invention, the ramp-shaped lifting member is disposed on the pivot plate.

According to yet another embodiment of the invention, the ramp-shaped lifting member is a plate disposed at an angle perpendicular to the brake arm.

According to a still further embodiment of the invention, the ramp-shaped lifting member slides against, and thereby lifts the brake arm as the pivot plate pivots from the first position to the second position.

According to yet another embodiment of the invention, the ramp-shaped lifting member slides against, and thereby lifts said brake arm as the pivot plate pivots from the second position to the first position.

According to a still further embodiment of the invention, the wrapping material is netting, twine, plastic film, or other material used to wrap forage.

In accordance with yet another embodiment, the ramp-shaped lifting member is adjustably attached to the pivot plate.

According to still a further embodiment of the invention, a pull pin arranged on the pivot plate serves as a drum locking mechanism for locking the brake drum in a fixed position.

According to a still further embodiment of the invention, said roll mount further comprises comprising a latch mechanism for holding the shaft in the first position. The latch mechanism is disposed at an end of the shaft opposite the pivot plate and comprises a first fixed latch plate and a second spring-biased latch plate.

Further objects, features and advantages of the present invention will become apparent from the Detailed Description of Preferred Embodiments, which follows, when considered together with the attached drawings.

DETAILED DESCRIPTION OF THE INVENTION

Figure 1:
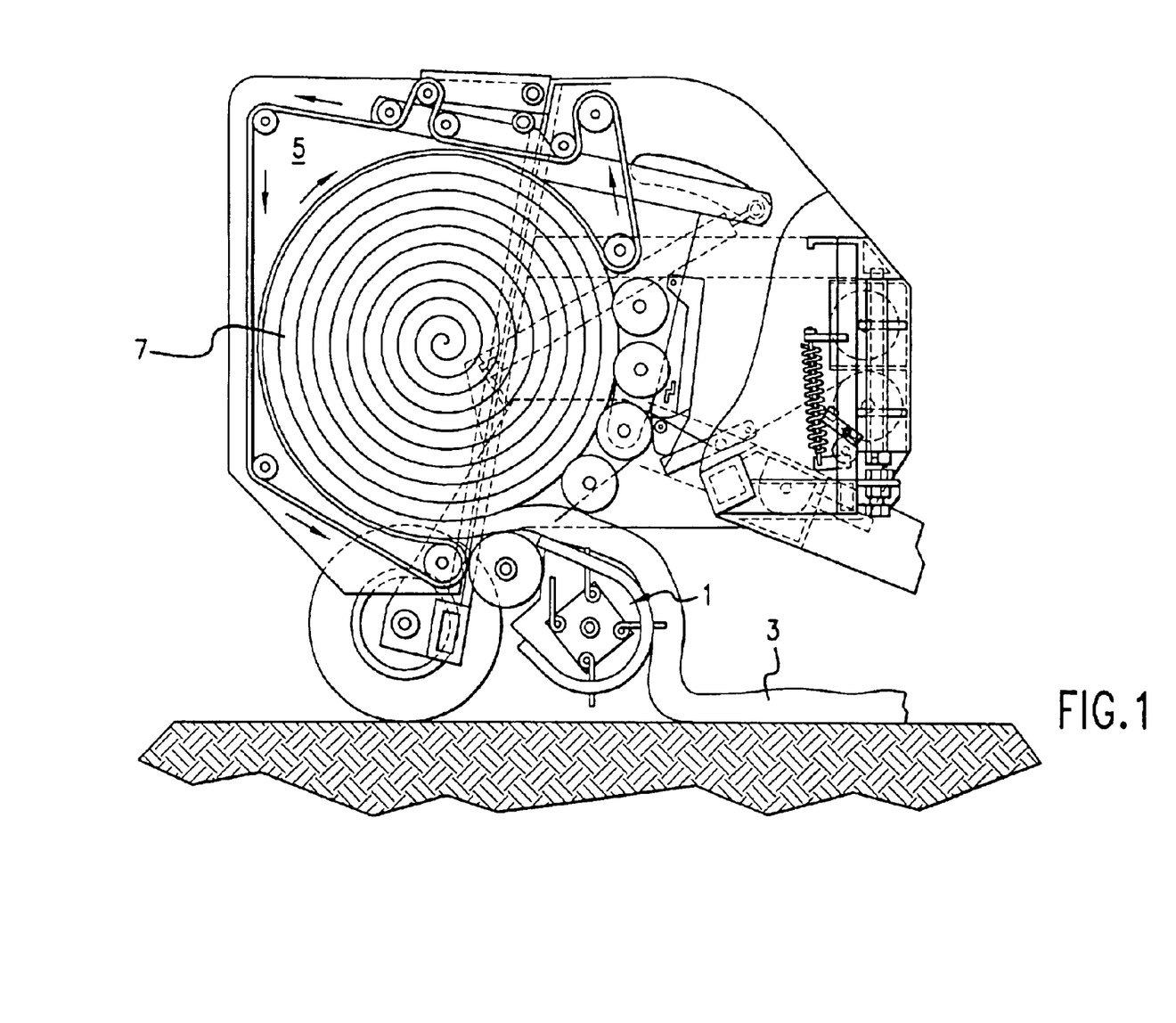
FIG. 1 is a schematic drawing of a conventional agricultural harvester in accordance with a preferred embodiment of the present invention.

In a preferred embodiment, the present invention provides a wrapping material dispenser roll brake release mechanism for an agricultural forage baler that allows unencumbered access to a bale wrapping material dispenser roll for dispenser roll replacement or any other servicing or maintenance of the baler where it is useful to move the wrapping material dispenser assembly and pivot it out of the way. As seen in FIG. 1, conventional balers often include a feeder assembly 1 which takes the cut crop material 3 and feeds it into a bale forming chamber 5, which may be a fixed or variable chamber, where the cut crop material 3 accumulates and is compressed by a bale forming apparatus to form a cylindrical package of cut crop material, commonly referred to as a "bale." The bale 7, while it is in this compacted and formed state, is wrapped by a bale wrapping apparatus with a wrapping material such as twine, netting, plastic film, or the like. The end result is a wrapped form-sustaining bale, typically having a round or cylindrical shape that is ejected from the bale-forming chamber onto the ground for subsequent handling.

In any event, the operator of such balers must replace the spent wrapping material rolls with new rolls from time-to-time as wrapping material is used up. Likewise, various internal baler assembly components and assemblies likewise require servicing and/or maintenance from time-to-time, but the wrapping material dispenser assembly obstructs access to these components.

Figure 2:
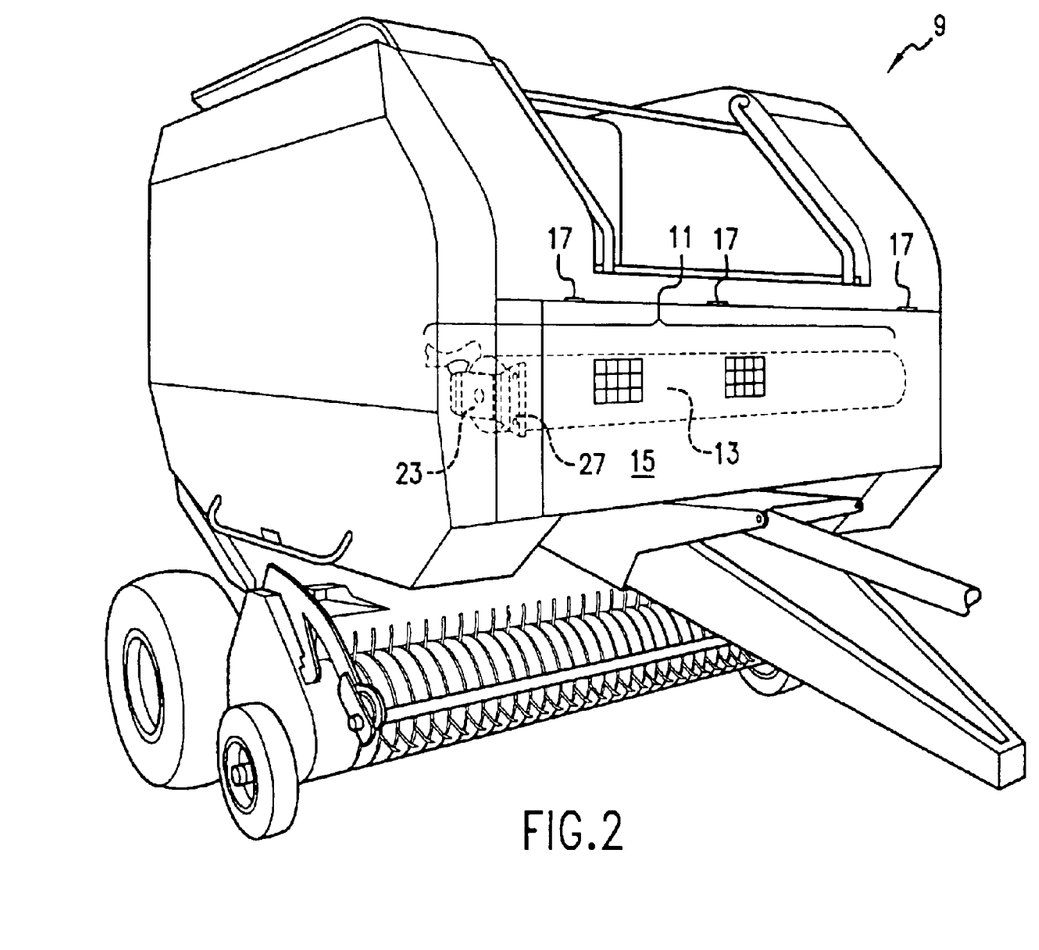
FIG. 2 is a perspective drawing of an agricultural harvester in accordance with a preferred embodiment of the present invention.

In a preferred embodiment, and seen in FIG. 2, a baler 9 houses a wrapping material dispenser assembly 11 having a wrapping material dispenser roll 13 mounted thereon (both shown by dotted lines behind door 15, which opens upwards on hinges 17).

Figure 3:
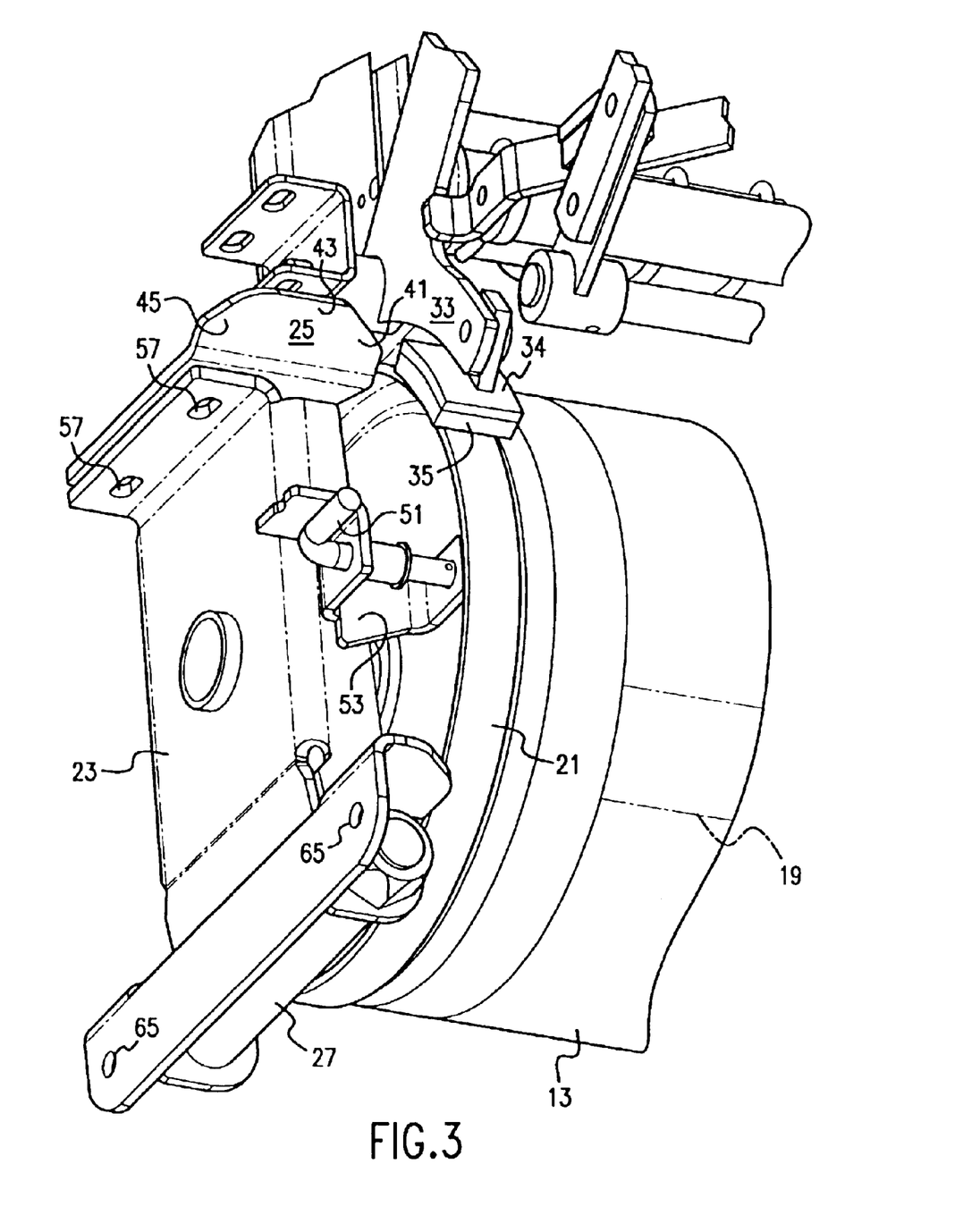
FIG. 3 is a detailed top perspective drawing of the hinge portion of the brake and dispenser assembly in accordance with the preferred embodiment of the present invention shown in FIG. 2, wherein the assembly is shown in the functional position.

Once door 15 is opened, it is seen in FIG. 3 that the assembly 11 includes a cylindrical shaft material roll mount 19 arranged to carry a roll 13, a brake drum 21, a net pivot plate 23, a lifting member 25, and a hinge 27. Hinge 27 is fixedly mounted to an internal sidewall or other structural support member of baler 9 by welding, bolting or other appropriate means of connection. Preferably, bolts 61 (not shown) connect the hinge 27 to internal structural steel support member 63 (not shown) at hinge mounting holes 65.

Figure 4:
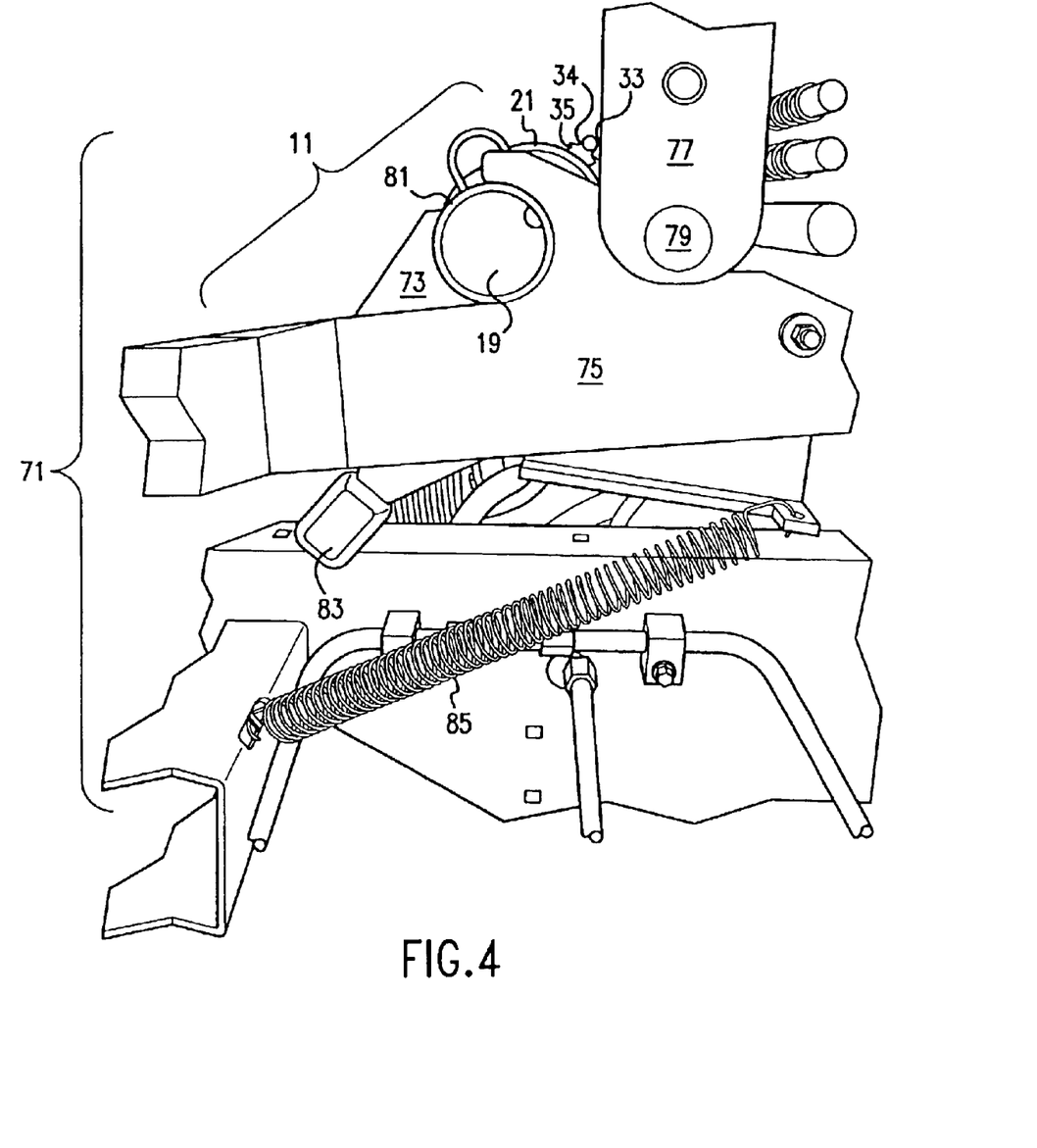
FIG. 4 is a side view of a latch mechanism, opposite the brake shown in FIG. 2, but showing the brake and a remainder of the dispenser assembly in the functional position in accordance with the preferred embodiment of the present invention shown in FIGS. 2 and 3.

As seen in FIG. 4, assembly 11 also includes a latch assembly 71 including internal 73 and external 75 parallel latch plates both mounted on pivot rod 79, which is held up and journaled by vertical support member 77. Plates 73 and 75 pivot with respect to one another about rod 79 to latch and unlatch the detachable end 81 of roll mount 19. Handle 83 is used to unlatch roll mount 19 by pulling internal latch plate 73 down against the bias of spring 85 to release end 81. For convenience, roll 13 is not shown in FIG. 4.

Figure 7:
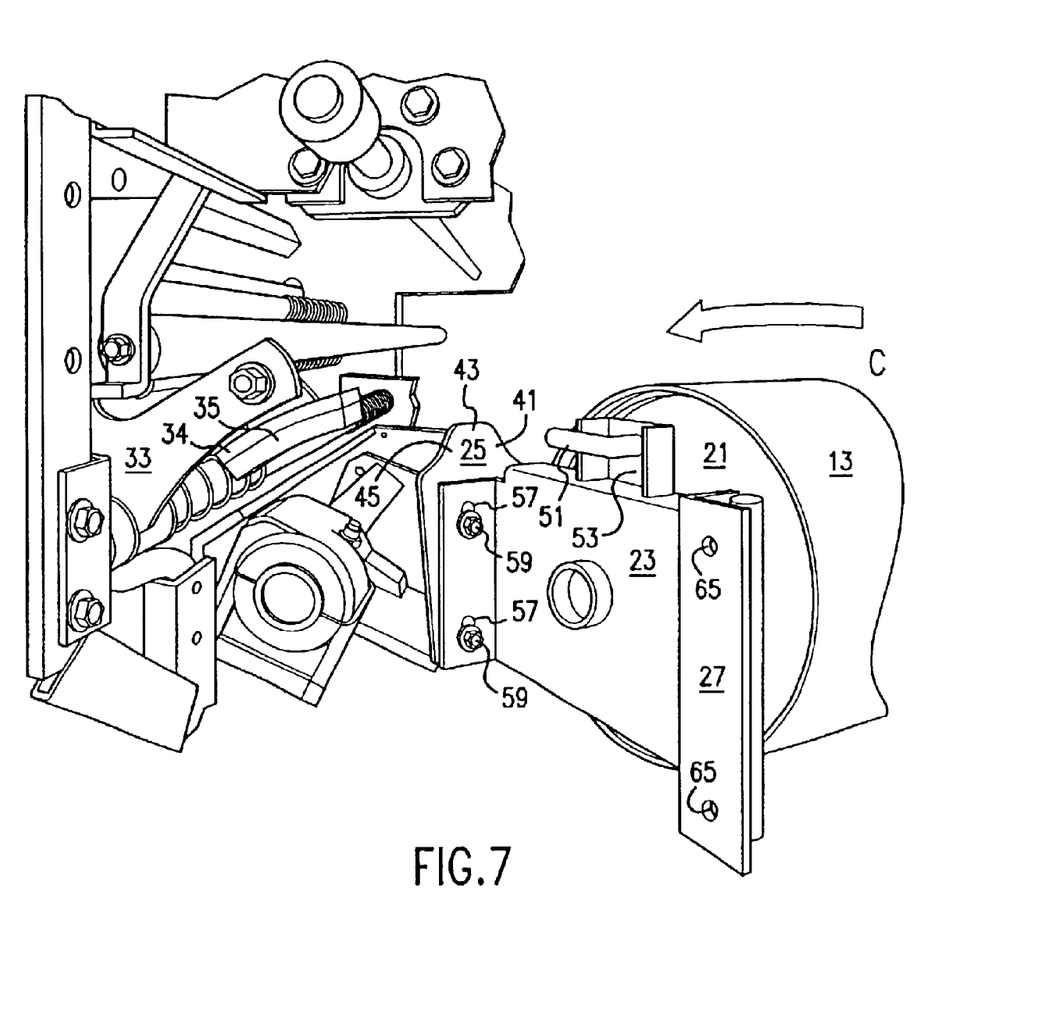
FIG. 7 is a perspective drawing of the brake and dispenser assembly in accordance with the preferred embodiment of the present invention shown in FIGS. 2, 3, and 4, wherein the dispenser roll is in an access position.

Access to the dispenser roll assembly 11 and roll 13, as well as to any components obstructed by assembly 11 and roll 13, is then achieved by opening the wrapping material dispenser assembly 11 from its first functional position A, illustrated in FIGS. 2, 3, and 4, to an access position C illustrated in FIG. 7. Portions of assembly 11, including the netting roll 13, which rests upon the wrapping material roll mount 19, the brake drum 21, the net pivot plate 23, and the lifting member 25 all pivot about hinge 27 from functional position A towards access position C. This construction allows the operator to access both the dispenser roll and any otherwise obstructed internal components or assemblies that may need to be cleaned, serviced, repaired, replaced or examined.

Notwithstanding the access afforded by the pivotal opening of the dispenser assembly net pivot plate 23, in its functional position A seen in FIGS. 2, 3, and 4, the dispenser assembly 11, and in particular the brake drum 21, is under a constant braking pressure exerted by brake assembly 31 through brake arm 33, brake shoe 34, and brake pad 35. Brake arm 33 must thus be disengaged from drum 21 before the assembly 11 can be smoothly swung open. Because of the gap between plate 23 and drum 21, into which the brake arm 33 and pad 35 might otherwise fall if pad 35 were allowed simply to slide off of drum 21 while opening assembly 11, it is extremely desirable to lift brake arm 33 and pad 35 off of and away from the assembly 11 while it opens, especially in view of the constant force provided to brake arm 33 against the drum 21 by biasing spring 37 (not shown).

Figure 5:
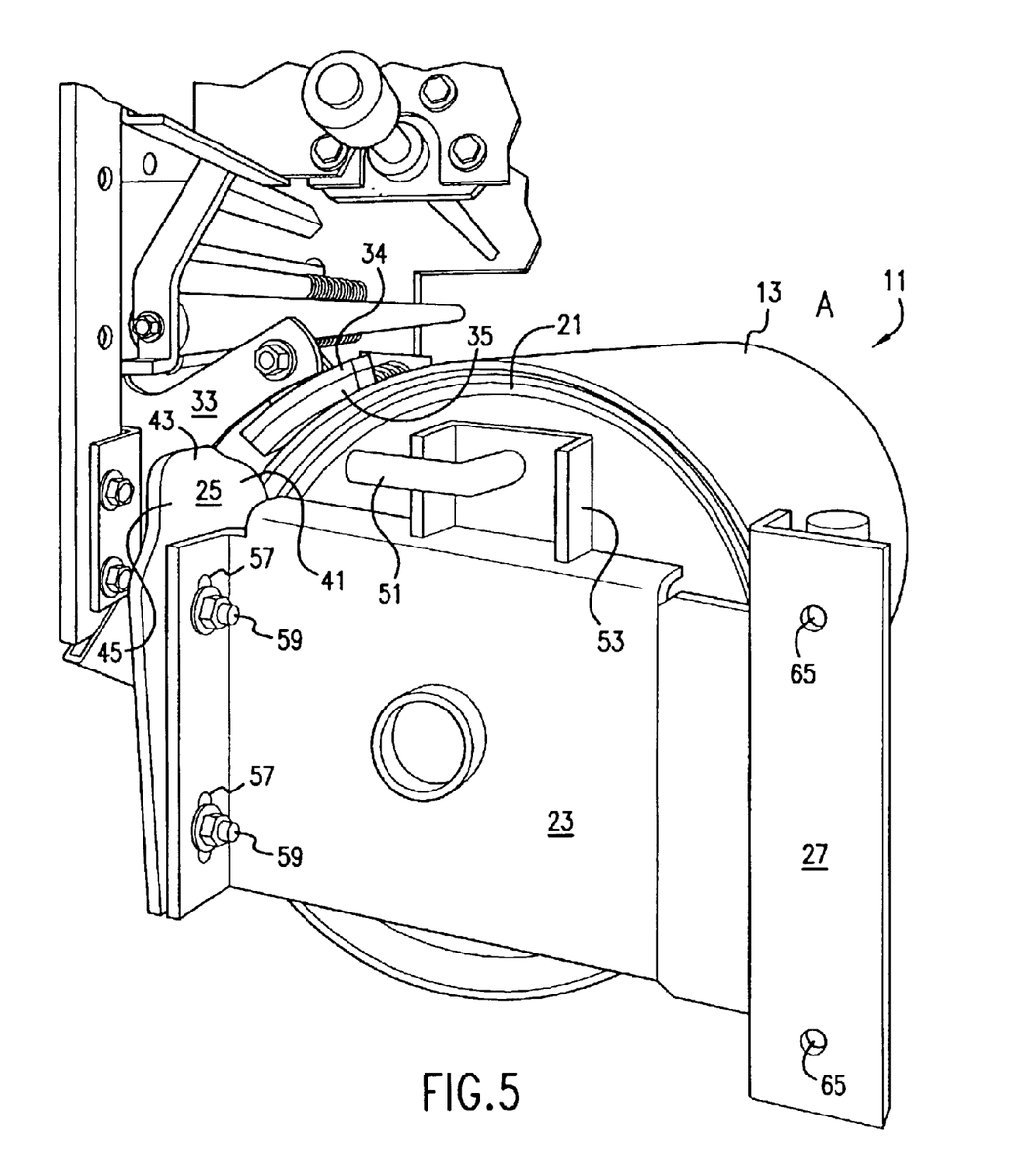
FIG. 5 is a perspective drawing of the brake and dispenser assembly in accordance with the preferred embodiment of the present invention shown in FIGS. 2, 3 and 4, wherein the dispenser roll is just leaving the functional position.
Figure 6:
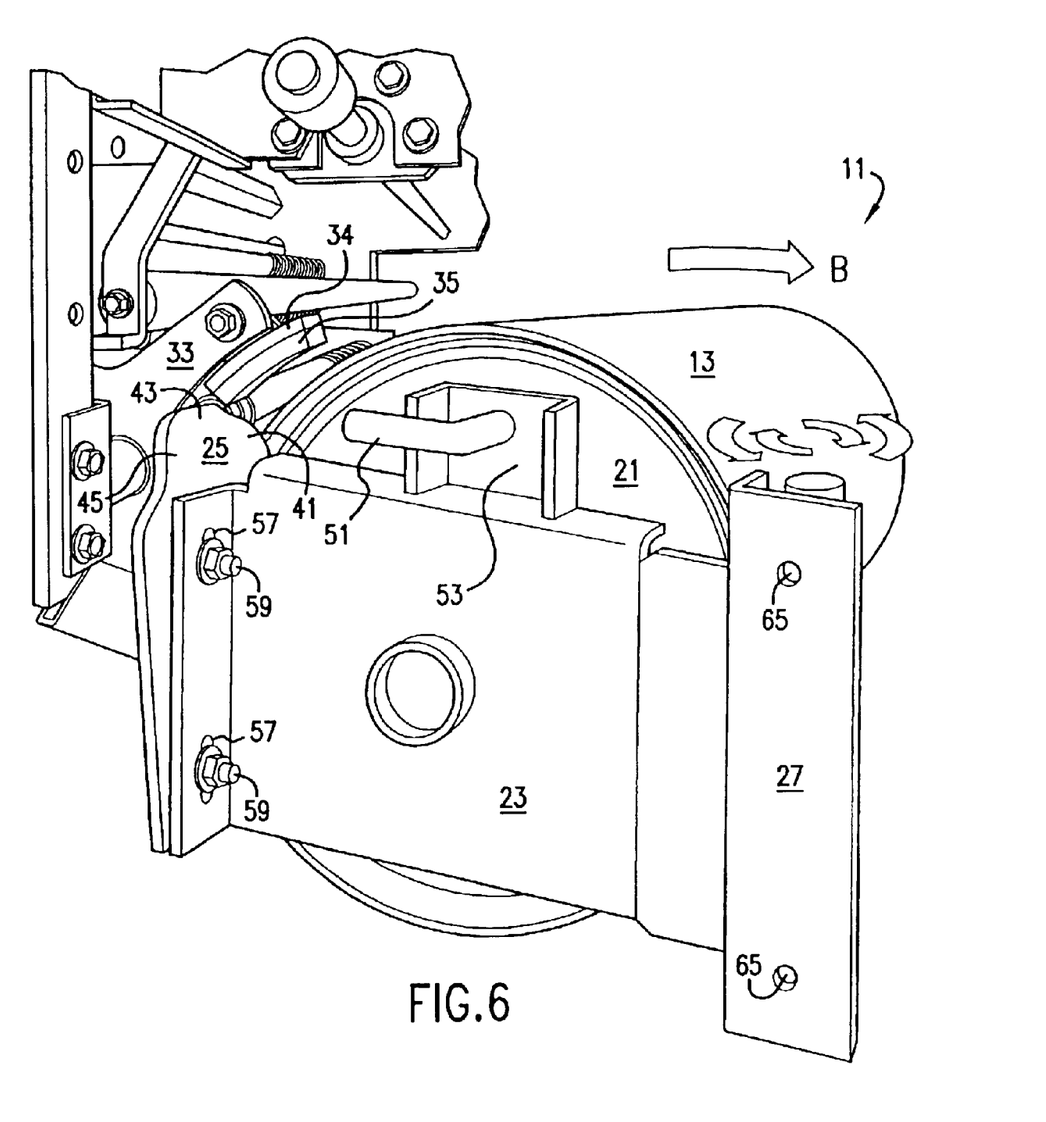
FIG. 6 is a perspective drawing of the brake and dispenser assembly in accordance with the preferred embodiment of the present invention shown in FIGS. 2, 3, and 4, wherein the dispenser roll is in an intermediate position, leaving the functional position.

Therefore, as sequentially illustrated in FIGS. 5, 6, and 7, as the wrapping material roll mount 19 pivots towards an access position C while riding on pivot plate 23 about hinge 27, the front side 41 of lifting member 25 engages, and thereby lifts the brake arm 33 and brake pad 35 off of drum 21. As the roll mount 19 approaches and finally reaches a fully open access position C, the brake arm slides with respect to the lifting member 25, up the front side 41, then across the middle portion 43, and down the back side 45 of lifting member 25. FIG. 6 illustrates lifting member 25 sliding across the middle portion 43.

The lifting member 25 similarly works to lift and then reposition the brake arm 33 onto drum 35 during movement of the dispenser assembly from a second, open, access position C, to the first, closed, functional position A. As can be envisioned by viewing the sequence of FIGS. 7, 6, and 5, as the wrapping material roll mount 19 pivots towards from access position C while riding on pivot plate 23 about hinge 27, the back side 45 of lifting member 25 engages, and thereby lifts the brake arm 33 and brake pad 35 to a height sufficient to provide clear passage of the on-coming plate 23 and external side of drum 21. As the roll mount 19 approaches and finally reaches the functional position A, the brake arm slides with respect to the lifting member 25, up the back side 45, then across the middle portion 43, and down the front side 41 of lifting member 25 to rest upon drum 21 according to the tension exerted on the brake arm 33 by spring 37, at roughly the same moment as end 81 of mount 19 is again latched between plates 73 and 75, and the assembly 11 returns to its functional position A.

Referring again to FIG. 3, in a preferred embodiment, the lifting member 25 is a ramp-shaped member wherein both its front 41 and back 43 sides comprise ramps. It is preferably made of a bent steel plate welded, bolted, or otherwise fixedly and adjustably attached to the dispenser assembly 11, and preferably to the pivot plate 23, by bolts 59. Plate 23 further includes lifting member-positioning slots 57 through which bolts 59 secure lifting member 25 to the plate 23. Slots 57 allow height adjustment. In an alternate preferred embodiment, plate 23 has horizontally disposed slots for variable horizontal positioning of lifting member 25. It will be recognized that other means of adjusting the height and attitude of lifting member 25 are contemplated within the scope of the present invention.

The assembly 11 further includes a drum locking pin 51 and pin bracket 53 fixedly attached, preferably by welding, to the pivot plate 23. Pin 51 removably engages, and holds in a fixed not rotatable position, drum 21 and roll mount 23 via at least one aperture 55 (not shown) in the external side of drum 21.

Components of the above-described embodiment are preferably fashioned from steel or other metal, material, alloy, or composite suitable for use in an agricultural harvester.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A wrapping material brake release assembly, comprising:
   a wrapping material dispenser roll mount pivotable between a first functional position to dispense material from a dispenser roll and a second access position to provide access to the dispenser roll;
   a brake assembly having a brake member arranged to brake the dispenser roll when the mount is in the first functional position;
   a ramp-shaped lifting member arranged to lift the brake member from the dispenser roll when the mount is pivoted from the first position to the second position.

2. The wrapping material brake release assembly of claim 1, wherein said ramp-shaped lifting member has first and second ramped sides, the first ramped side engaging said brake assembly when said mount is pivoted from the first position to the second position, the second ramped side engaging said brake assembly while said mount is pivoted from the second position back to the first position.

3. The wrapping material brake release assembly of claim 2, wherein said roll mount further comprises a brake drum, and wherein said brake member comprises a brake arm and a brake pad attached to the brake arm and arranged to contact the brake drum to brake the roll.

4. The wrapping material brake release assembly of claim 3, wherein said roll mount further comprises a pivot plate arranged to pivot from the first to the second positions, and a shaft attached at one end to the pivot plate.

5. The wrapping material brake release assembly of claim 4, wherein said roll mount further comprises comprising a latch mechanism for holding the shaft in said first position.

6. The wrapping material brake release assembly of claim 5, wherein the latch mechanism is disposed at an end of the shaft opposite the pivot plate.

7. The wrapping material brake release of assembly claim 6, wherein the latch mechanism further comprises a first fixed latch plate and a second, pivoting spring-biased latch plate.

8. The wrapping material brake release assembly of claim 4, wherein said ramp-shaped lifting member is disposed on said pivot plate.

9. The wrapping material brake release assembly of claim 8, wherein said ramp-shaped lifting member is a plate disposed at an angle perpendicular to said brake arm.

10. The wrapping material brake release assembly of claim 9, wherein said ramp-shaped lifting member is adjustably attached to said pivot plate.

11. The wrapping material brake release assembly of claim 9, further comprising a drum locking mechanism arranged to lock the brake drum in a fixed position.

12. The wrapping material brake release assembly of claim 11, wherein the drum locking mechanism is a pull pin arranged on the pivot plate.

13. The wrapping material brake release assembly of claim 9, wherein said ramp-shaped lifting member slides against, and thereby lifts said brake arm as the pivot plate pivots from the first position to the second position.

14. The wrapping material brake release assembly of claim 13, wherein said ramp-shaped lifting member slides against, and thereby lifts said brake arm as the pivoting plate pivots from the second position to the first position.

15. The wrapping material brake release assembly of claim 14, wherein said wrapping material is netting, twine, plastic film, or other material used to wrap forage.

16. The wrapping material brake release assembly of claim 14, wherein said ramp-shaped lifting member is adjustably attached to said pivot plate.

* * * * *